United States Patent [19]
Schultz et al.

[11] 4,443,865
[45] Apr. 17, 1984

[54] PROCESSOR MODULE FOR A PROGRAMMABLE CONTROLLER

[75] Inventors: Ronald E. Schultz, Willoughby; Steven H. Rigg, Willowick, both of Ohio

[73] Assignee: Allen-Bradley Co., Milwaukee, Wis.

[21] Appl. No.: 314,596

[22] Filed: Oct. 26, 1981

[51] Int. Cl.³ .............................................. G06F 9/00
[52] U.S. Cl. ................................................... 364/900
[58] Field of Search .............. 364/136, 139, 140, 141, 364/200, 900

[56] References Cited

U.S. PATENT DOCUMENTS

| | | | |
|---|---|---|---|
| 3,798,612 | 3/1974 | Struger et al. | 364/900 |
| 4,064,394 | 12/1977 | Allen | 364/139 |
| 4,092,730 | 5/1978 | Burkett et al. | 364/900 |
| 4,149,235 | 4/1979 | Froyd et al. | 364/136 |
| 4,200,915 | 4/1980 | Struger et al. | 364/900 |
| 4,215,396 | 7/1980 | Henry et al. | 364/136 |
| 4,215,397 | 7/1980 | Hom | 364/136 |
| 4,227,247 | 10/1980 | Kintner | 364/900 |
| 4,244,034 | 1/1981 | Cherba | 364/900 |
| 4,247,901 | 1/1981 | Martin et al. | 364/900 |
| 4,282,584 | 8/1981 | Brown et al. | 364/900 |
| 4,291,388 | 9/1981 | Ecker et al. | 364/900 |
| 4,302,820 | 11/1981 | Struger et al. | 364/900 |

Primary Examiner—Jerry Smith
Assistant Examiner—Mark P. Watson
Attorney, Agent, or Firm—Quarles & Brady

[57] ABSTRACT

A processor module is one of several modules mounted in a rack to form a programmable controller. The module has a microprocessor that executes a sequence of machine language instructions to interpret and thereby execute macroinstructions that are part of a control program stored in a read/write volatile main memory. The rate of execution is improved by reducing the instructions in a fetch sequence used in coupling each macroinstruction to its interpreter sequence of machine-language instructions. Hardware assistance is provided to allow expansion of macroinstruction operation codes as they are fetched. The processor module also allows the user to program his own interpreter sequences for specially defined macroinstructions and to load these sequences into a nonvolatile memory that is plugged into the module. An external auxiliary power supply is connected to the processor module to supply the programming voltage required by the nonvolatile memory.

16 Claims, 8 Drawing Figures

FETCH SEQUENCE FOR XIC 4 OP CODE

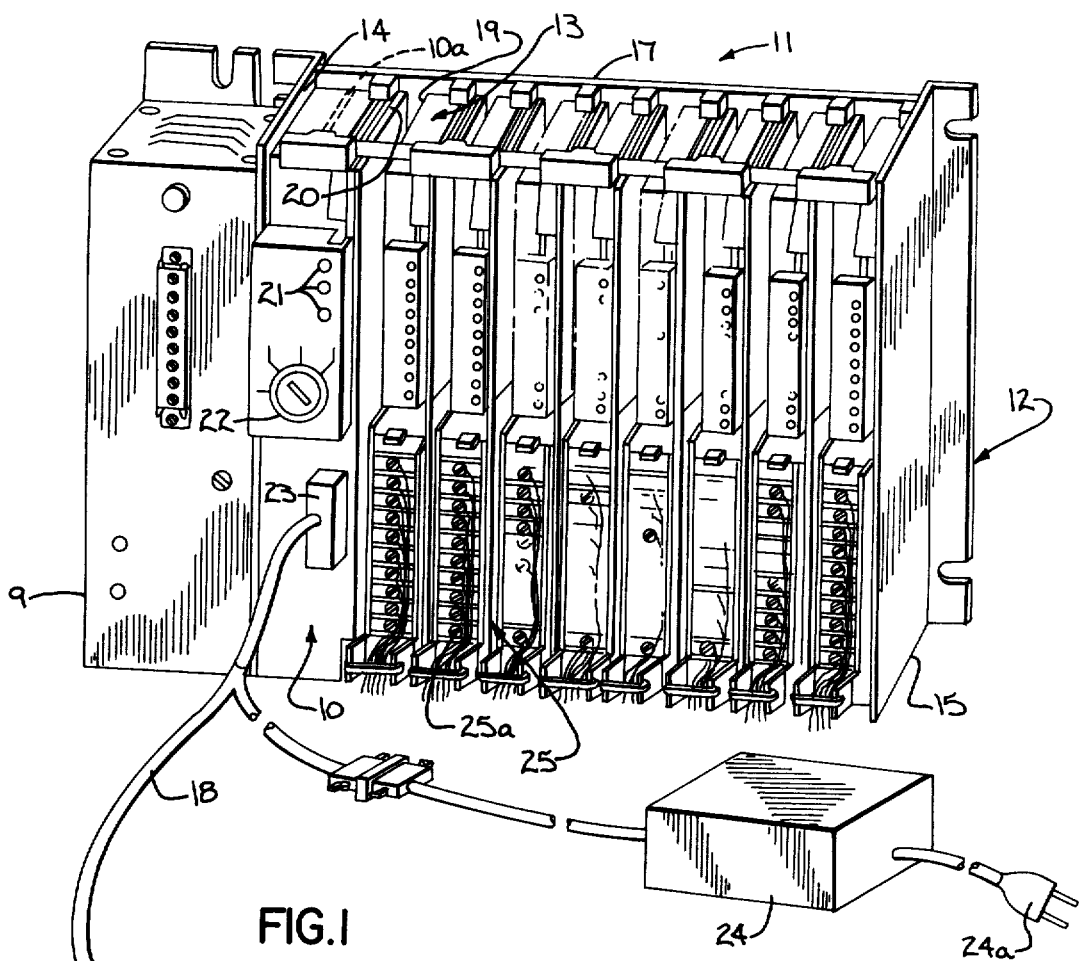
FIG.1
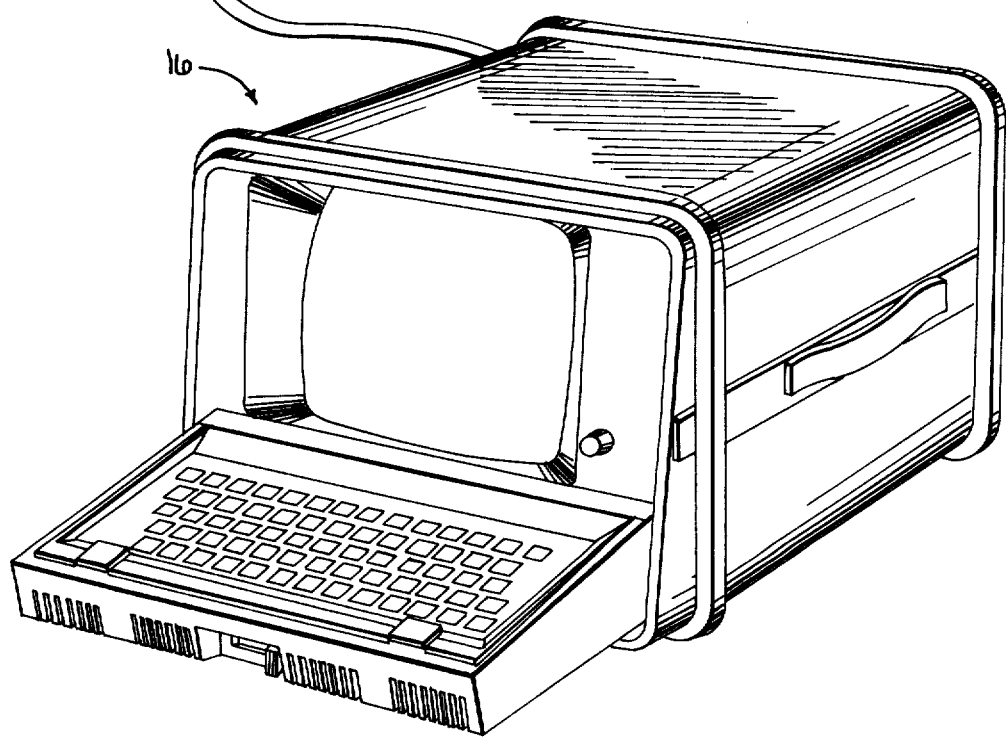

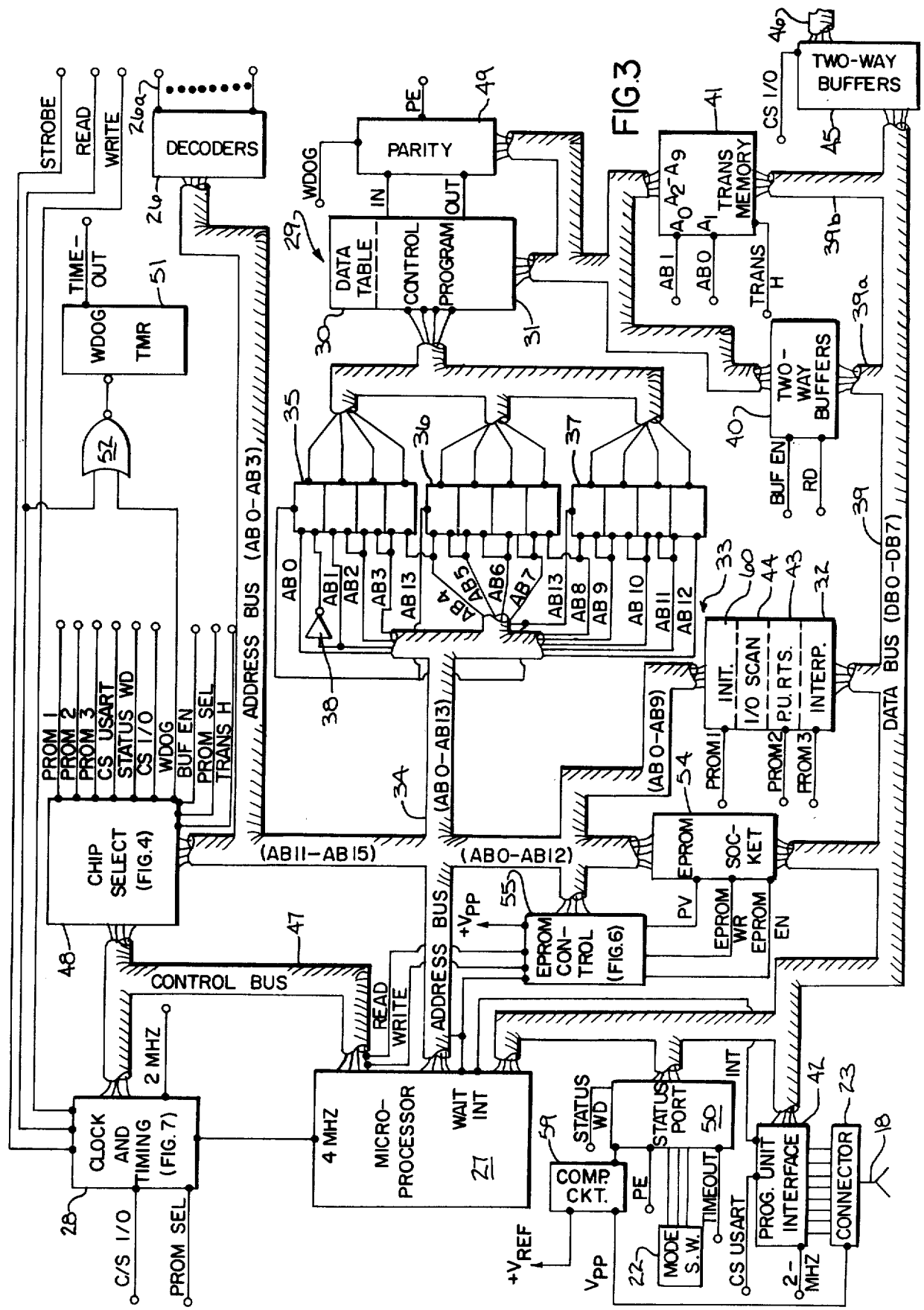

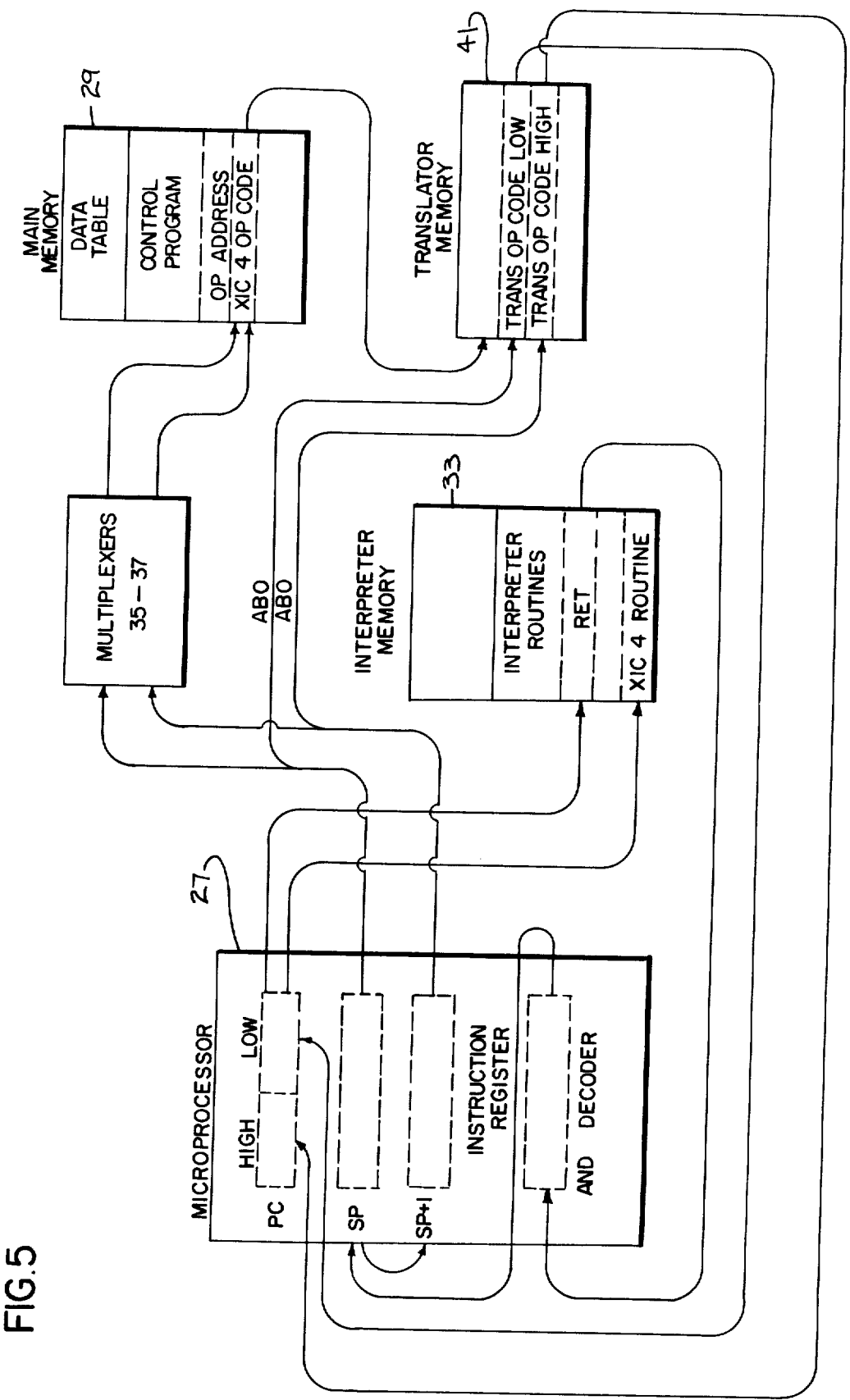

PROCESSOR MODULE FOR A PROGRAMMABLE CONTROLLER

BACKGROUND OF THE INVENTION

The invention relates to an improved processor for a programmable controller of the type used to control an industrial machine or process through input and output devices.

In Brown et al, U.S. Pat. No. 4,282,584, issued Aug. 4, 1981, a processor module executes user control instructions by translating and mappping these instructions to respective interpreter routines stored in a programmable read-only memory (PROM) on the module. This allows personnel who use the equipment to enter a program in ladder diagram format, which is easier to understand and represents a higher level language than the assembly language used in designing interpreter routines. This assembly language has been designed by the manufacturer of the particular microprocessor chip that is selected for the prime controlling element in the processor module.

In equipment of this type, an important feature is the speed or rate at which user instructions are executed, because this determines the scan rate at which the status of input devices is sensed and the status of output devices is set. As explained in the above patent application, each interpreter routine has a first portion to execute a control operation and a second portion, referred to as a "fetch" sequence, which is executed to find the first instruction in the interpreter routine for the next user macroinstruction in the control program. This "fetch" routine is thus repeatedly executed, and the quicker the microprocessor can execute this fetch sequence, the faster the user instructions can be executed.

Microprocessor chips typically have a number of internal registers. Some of these are used for pointing to the location of the machine language instructions to be executed by the microprocessor. Typically, a 16-bit word of information in a program counter (PC) register points to the instruction being executed, while a last-in-first-out (LIFO) internal memory area called a "stack" stores the addresses of instructions in subroutines to be executed later. A sixteen-bit register called a stack pointer (SP) is provided to address the stack when "pushing" data onto the stack or "popping" data off the stack. Other internal working registers in a microprocessor are used for storing intermediate data results or as counters.

In the above-mentioned processor module, the operation code and operand address are read out of the main memory and through the translator memory to a pair of internal working registers in the microprocessor. From there the operand address is shifted to another 8-bit working register. The 8-bit operation code becomes the low byte in the 16-bit program counter (PC) register after execution of several register exchange instructions. As the last step in this sequence, the microprocessor executes a jump indirectly to the interpreter routine, which has its address stored in a jump table at the location corresponding to the 8-bit address provided by the operation code. If this sequence could be shortened, the total scan time for a control program of many user instructions would be considerably shortened.

Besides executing each user program instruction with fewer machine language instructions, the execution time for the control program can be decreased by lowering the execution time for each "rung" of the control program. In the industrial control field, the control program usually takes the form of a ladder diagram in which the user program instructions are strung together to form rungs. If the execution of user program instructions produces a sequence of "true" results from one end of the rung to the other, the rung status is also "true." If this string of "true" results is broken by a "false" result, the status of the rung is usually "false," although a rung with multiple parallel branches requires "false" results in each parallel branch before the rung is declared to be "false." In prior controllers, all user program instructions in a rung were executed even after one or more "false" results were encountered. This was not an efficient use of processor time.

Besides increasing the speed of processor operation, it is also desirable to provide security for the control program once it is established, to prevent its loss during power interruption or other conditions that could affect the volatile main memory. To accomplish this, a processor module has been provided with a non-volatile, read-mostly memory into which a master copy of the control program can be transferred upon a user command, and later automatically called up if the program in the main memory cannot be verified. Such a module is disclosed in Ecker et al, U.S. Pat. No. 4,291,388, issued Sept. 22, 1981. In this application, the processor module is part of a programmable interface (PI) in a numerical control system having a relatively large power supply. This PI processor module receives ±15 d-c volt signals from the power supply through the backplane and includes circuitry for adjusting these signals to the level necessary to erase the contents of the non-volatile memory and to write control program instructions into this memory.

SUMMARY OF THE INVENTION

The invention is incorporated in a processor module with an improved interpreter section. The processor module operates under the direction of a microprocessor, which fetches the operation code of each user program instruction in a main memory by executing a single machine fetch instruction. A stack pointer register in the microprocessor is used to point to the address of a selected operation code, so that when a return (RET) instruction is executed, the operation code is loaded directly into the program counter without further manipulation. The transfer of the operation code between certain working registers of the microprocessor, as practiced in a prior processor module, has been eliminated to shorten the fetch sequence, and consequently, to shorten the execution time for user program instructions. Having loaded the operation code into the program counter the microprocessor will begin executing the interpreter routine to which it has been coupled through the fetch sequence.

The invention further provides for the expansion of the operation code by reading an unexpanded operation code through a translator memory twice in succession to produce an expanded operation code that is loaded into the program counter register. The unexpanded operation code and at least significant address signal are coupled to the translator memory twice, with the state of the least significant address signal being alternated to select two different addresses in the translator memory which each contribute a byte of the translated operation code. By expanding the operation code to sixteen bits, a jump table in the interpreter memory of prior processor module has been eliminated.

The invention further provides an improvement in executing the rungs of a user program in ladder diagram format. The microprocessor is responsive to an instruction in each interpreter routine to sense a "false" rung status and to skip the remaining instructions in that interpreter routine.

The invention further provides multiplexing means between the microprocessor and the main memory which allows the microprocessor to address an expanded range of addresses. While the processor "sees" an expanded area of memory, actual memory space is conserved to limit the cost of memory chips for the processor module.

The processor module also includes EPROM memory for nonvolatile storage of a user control program. The EPROM is sometimes referred to as a UV PROM as it is erasable with ultraviolet light. Data is written to the EPROM electrically through an EPROM control circuit. To initiate the transfer of a user control program to the EPROM memory, a 25.5 volt auxiliary d-c power supply is connected between a 120-volt a-c power source and a pin-style connector on the front of the processor module. The microprocessor in the processor module reads the presence of this "higher than logic level" d-c voltage and then executes the appropriate "burn-in" firmware sequence to apply this voltage and to enter the control program in the non-volatile memory. As "PROM-burning" is typically done at start-up of the programmable controller, and thereafter at reprogramming events, the external power supply provides convenience without adding to the bulk of the rack in this relatively small programmable controller. This aspect of the invention is applicable to other readmostly memories besides EPROMs, including EAROMs, where data is erased electrically.

The invented processor module also provides unusual versatility in allowing a user to store programs in a second program language in the EPROM. The EPROM is plugged into a socket on the module, and has half its capacity reserved for nonvolatile storage of user programs in the typical control program language, with the other half of its capacity being available for storage of machine language user programs. The machine language user program is developed on a programming terminal that is connected to the processor module and then loaded into the processor module, where the microprocessor executes a PROM "burn in" routine to store the machine language user program in the EPROM.

It is a specific object of the invention to increase the rate of executing user control program instructions.

It is another object of the invention to provide nonvolatile back-up memory for a small programmable controller that is not part of a larger controller.

It is another object of the invention to provide the capability for loading user programs in two program languages into a nonvolatile memory in the processor module.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, which is defined in the appended claims.

BRIEF DESCRIPTION OF THE DRAWINGS

FIG. 1 is a perspective view of a programmable controller with the processor module of the present invention connected to the auxiliary power supply of the present invention and to a programming terminal;

FIG. 3 is an electrical schematic view of the processor module of FIG. 1;

FIG. 5 is a diagram showing a sequence of actions in fetching a user program instruction within the processor module of FIG. 1;

DETAILED DESCRIPTION OF THE PREFERRED EMBODIMENT

Figure 2A:
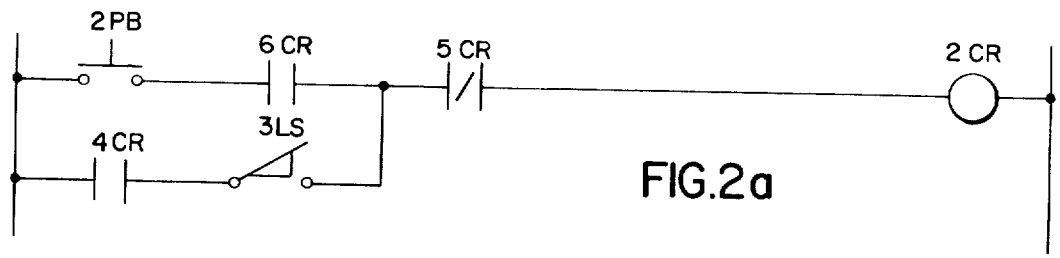
FIG. 2a is a ladder diagram of a portion of a typical user control program.

Referring to FIG. 1, the processor module 10 of the present invention is one of nine modules in a programmable controller 11 in which modules are carried upright in a side-by-side arrangement in a rack 12. Besides the processor module 10, there are eight I/O modules 13 confined between the spaced apart sidewalls 14 and 15 of the rack 12. The rack 12 may be of different sizes in other embodiments so that a greater or lesser number of I/O modules 13 may be included. A main power supply 9 is mounted on the left sidewall 14 and is connected to the processor module 10 through a short cable (not shown). The processor module 10 is electrically connected to the I/O modules 13 through a backplane motherboard 17 that extends across the back of the rack 12 from the left sidewall 14 to the right sidewall 15.

The processor module 10 and the I/O modules 13 are formed by one or more circuit boards 10a and 13a which carry electronic chips that are partially enclosed within plastic covers 19 around the outside of the circuit boards 10a and 13a. The modules 10 and 13 slide into slots formed between upright, closely spaced barriers 20 in the rack 12, and in this position, their circuit boards 10a and 13a each present a back edge that engages an edge connector (not shown) mounted on the back plane motherboard 17. Columns of LED (light-emitting diode) status indicators 21 are mounted along an upper front edge of the I/O circuit boards 13a and several status indicators 21 and a four-position mode switch 22 are disposed along the upper front edge of one of the circuht boards 10a in the processor module 10. A pin-style connector 23 (not shown in FIG. 1) is positioned along the lower front edge of one of the processor circuit boards 10a and, as explained in more detail below, is connected to a programming terminal 16 and to an auxiliary power supply 24 through a Y-cable 18. Columns of wiring terminals 25a are disposed along swing arm connectors 25 that pivot around a lower support rod (not shown) to engage the lower front edges of the circuit boards 13a in the respective I/O modules 13 and to connect through wires to I/O devices (not shown) of the type known in the art for controlling an industrial machine or process. Further details concerning the construction of the rack 12 are provided in Struger et al, U.S. Pat. No. 4,151,580, issued Apr. 24, 1979, and assigned to the assignee of the present invention.

The I/O modules 13 form an "interface" between the processor module 10 and the I/O devices. The I/O modules 13 are usually a mix of input modules and output modules that connect to input devices and output devices, respectively. Input modules are typically connected to input devices such as photocells, limit switches, selector switches and pushbutton switches, so that signals from a group of these devices can be collected or multiplexed to form words of digital data that are read by the processor. Output modules are typically connected to output devices such as solenoids, relays, motor starters and electrically controlled hydraulic valves to receive words of digital data from the processor module 10 and to distribute or demultiplex this data in the form of command signals for operating the output devices. In some embodiments, the I/O modules 13 may also convert between analog signals used by the I/O devices and digital signals recognized by the processor module 10, or may perform other kinds of data processing to interface the I/O devices to the processor module 10.

Referring to FIG. 3, the operations of the processor module 10 are directed by a microprocessor 27, which is operated by clock signals that are received from a clock and timing circuit 28 at a frequency of 4 megahertz (MHZ). In this example, the microprocessor 27 is Z80A-CPU microprocessor available from Zilog, Inc. The Z80A-CPU is associated with a specific set of assembly language instructions, which can be converted to machine language equivalents that are represented as hexadecimal-coded or binary-coded instruction words. This conversion is performed by an assembler program. These assembly language instructions and their machine language equivalents together with the architecture and operation of the chip are explained in a Z80-CPU Technical Manual, copyright 1976 by Zilog, Inc.

Programmable controllers are designed for application to a wide variety of uses without the necessity of internal rewiring within the controller. This is accomplished by providing a main memory 29 in which the user enters the instructions of a control program 31. These user instructions correspond to functions in ladder diagrams, which have been used for many years in the industrial control field, and which have been adapted and refined for use in programmable controllers. Control program instructions can be represented by either functional symbols, or mnemonics, such as XIC, XIO and OTE and represent a higher level language than the machine language recognized by the microprocessor 27.

Figure 2B:
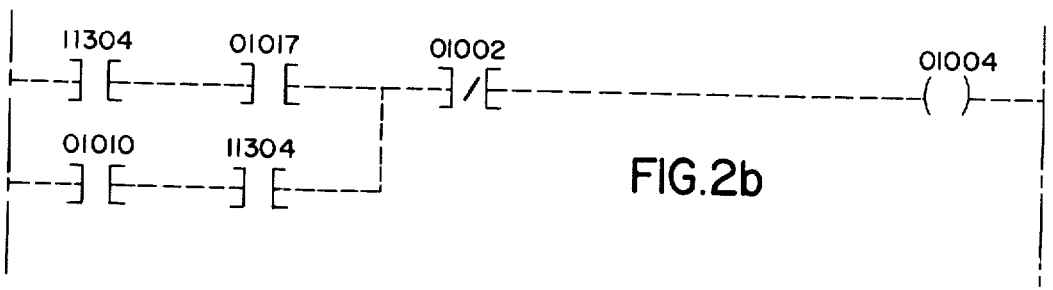
FIG. 2b is the portion of the user control program of FIG. 2a as it would be displayed on the screen of the programming terminal.

Referring to FIG. 2a, one rung in a ladder diagram is shown with the following inputs: a pushbutton 2PB, two normally open sets of relay contacts 6CR and 4CR, a normally open limit switch 3LS and a normally closed set of relay contacts 5CR. The energizing of an output in the form of a relay coil 2CR is dependent upon the denergizing of a 5CR relay coil to open the 5CR contacts and one of the following two combinations: either the pushbutton contacts 2PB and the relay contacts 6CR must be closed to complete a first branch of the rung; or the relay contacts 4CR and the limit switch 3LS contacts must be closed to complete a second branch. FIG. 2b shows how this ladder diagram would appear on the screen of the programming terminal 16. The five-place numbers are I/O addresses of the input and output devices as seen by the user. These numbers are converted by the microprocessor 27 to locations in a data table 30 in the main memory 29. The first user instruction appearing in the figure may be expressed XIC 11304 or examine the input device at address "11304" to determine if its contacts are closed. The XIO 01002 instruction examines status data from an input device at address 01002 to determine if the contacts of the device are open. And, the OTE 01004 instruction sets a bit at address 01004 in the data table to energize an output device when a path of true conditions can be traced from the left side of the diagram to the right. As the control program 31 is executed bits are examined and set in the data table 30, and when an I/O routine is executed, the input data is brought into the input locations in the data table 30 from the input modules and output data is coupled from the data table 30 to the output modules.

These control program macroinstructions are related to machine language microinstructions that are organized in interpreter routines 32 and stored in an interpreter memory 33. Each interpreter routine 32 may include several machine language microinstructions that are executed in order to perform the operation directed by a single control program macroinstruction, thereby "interpreting" the macroinstruction.

It is helpful in understanding the present invention to understand how the following sequence for the XIC 11304 instruction would be executed by a processor module of the prior art as described in Brown et al, U.S. Pat. No. 4,282,584, cited above. This sequence is expressed in assembly language rather than its machine language equivalent. Because the last number in the I/O address is 4, it is bit 4 in an input word of data that would be examined in executing the XIC 4 interpreter routine.

TABLE 1

| Sequence Label | XIC 4 Interpreter Routine | |
|---|---|---|
| | Instruction Mnemonic | Comment |
| | LD A, (DE) | Load operand in A Register |
| | BIT 4, A | Test bit 4. |
| | JR NZ, FETCH | Jump to fetch next user instruction if bit 4 is true (logic high). |
| | RES O, B | Reset rung status if bit 4 is false (logic low). |
| FETCH: | POP HL | Get next instruction, store the operand address in the L register, and store the operation code in the H register. |
| | LD E,L | Load the operand address (the low byte of the control program instruction) into the E register of the microprocessor. |
| | LD L,H | Form the address |
| | LD H,C | in HL which specifies a location in the jump table in the interpreter memory. |
| | JP(HL) | Jump indirect via the jump table in the interpreter mem- |

TABLE 1-continued

| | XIC 4 Interpreter Routine | |
|---|---|---|
| Sequence Label | Instruction Mnemonic | Comment |
| | | ory to a selected interpreter routine. |

The prior art processor module used the Z-80A microprocessor therefore, the instructions are Z-80 assembly language instructions and the comments refer to various internal registers which are also found in the microprocessor 27 of the present processor module 10. The primary accumulator register is A; B and C are two eight-bit working registers arranged as a pair; D and E are two eight-bit working registers arranged as a pair; and H and L are two eight-bit registers arranged as a pair and commonly used as an address pointer. In addition, the Z-80A microprocessor has a sixteen-bit stack pointer (SP) register for pointing to addresses or data in a last-in-first-out (LIFO) stack of registers. This stack pointer may also be used to point to memory that is external to the microprocessor chip. Prior to executing the POP HL instruction, for example, the stack pointer is initialized to point to an address in the main memory 29 and the POP instruction loads the contents of that memory location into the HL pair of registers. On the other hand, when an address in the interpreter memory has been formed in the HL register, the instruction JP(HL) performs an indirect jump—in effect a double jump—to a second location in the interpreter memory which is stored at a first location in a jump table in the interpreter memory. The jump table location is pointed to by the address in the H and L registers. In the prior processor module, a set of first locations for all of the interpreter routines made up the jump table, which allowed access to a large area of memory through a first section that could be addressed with only eight bits of data. The composition of the jump table and interpreter routines for a large set of user program instructions is described in Brown et al, U.S. Pat. No. 4,282,584, cited above.

Referring again to FIG. 3, each user instruction in the control program 31 is stored in the main memory 29 with an eight-bit operand address and an eight-bit operation code stored in consecutive lines. The data table 30 of I/O status data is stored in a section of the main memory 29 with lower addresses than those of the control program 31. The microprocessor 27 reads control program instructions by addessing the main memory 29 through lines AB0-AB13 of a 16-bit address bus 34. Lines AB0-AB12 connect to inputs on three multiplexers 35-37, with lines AB1-AB12 each connected to a pair of adjacent inputs on one of the multiplexers 35-37. Line AB1 is connected to the low order input on the first multiplexer 35 through an inverter 38. Line AB13 is connected to a select terminal on each of the three multiplexers 35-37 to shift between coupling signals on address lines AB0-AB11 and coupling signals on lines AB1-AB12 to the main memory 29 for reasons that will become apparent from details provided later in the description. Control program instructions are coupled to and from the main memory 29 through lines DB0-DB7 of an eight-bit data bus 39. The data bus 39 is connected to the main memory 29 through a two-way branch 39a and a one-way output branch 39b. A set of two-way buffers 40 is connected in the two-way branch 39a and a translator memory 41 is connected in the output branch 39b. The buffers 40 are enabled through a buffer enable (BUF EN) line and a TRANS L line, while the translator memory 41 is enabled through a TRANS H line. Lines AB0 and AB1 of the address bus are connected to address inputs A1 and A0, respectively, on the translator memory 41 and the eight lines of the data bus 39 are connected to address inputs A2-A9 on the translator memory 41.

The control program 31 is loaded, edited and displayed by connecting a programming terminal 16, which is one of several types of programming units known in the art, through the Y-cable 18 to the connector 23, which has its pins connected to inputs to a programming unit interface circuit 42. This circuit 42 is also connected to the data bus 39 and includes a USART, which is a commonly known device for converting between serial data received and sent through the connector 23 and parallel data which is coupled through the data bus 39. When control program instructions in the main memory 29 are to be loaded or edited, the interface circuit 42 generates an interrupt signal through an INT line that connects to a corresponding INT input on the microprocessor 27. A signal on this line generates a maskable interrupt (so-called because it can be ignored under certain conditions) that normally causes the microprocessor 27 to execute programming unit routines (P.U. RTS.) 43 in the interpreter memory 33 to carry out programming functions.

Besides the programming unit routines 43, the interpreter memory 33 also stores an I/O scan routine 44, which is executed after each cycle through the control program 31 to couple I/O status data between the data table 30 and the I/O modules 13. During execution of the I/O scan routine 44, fresh input data is coupled to the data table 30 from the input modules and fresh output data is coupled to the output modules from the data table 30. In order to transfer this data, the microprocessor 27 and the main memory 29 are connected through lines AB0-AB3 of the address bus to a pair of three-to-eight-line decoders 26 that operate as a single four-to-sixteen-line decoder to decode signals on lines AB0-AB3 and to enable selected I/O modules 13 in sequence. In this embodiment, only eight of the sixteen available enable lines 26a are used as only eight I/O modules 13 are present in the programmable controller rack 12. The microprocessor 27 and the main memory 29 are also coupled to the I/O modules 13 through the data bus 39, a second set of two-way buffers 45 and an eight-bit I/O data bus 46 formed in the backplane motherboard 17. When data is coupled to or from the data table 30 it passes through the first set of two-way buffers 40 as untranslated data. The processor 10 is also connected through the backplane 17 of FIG. 1 to the I/O modules 13 by a STROBE line, a READ line and a WRITE line. The READ and WRITE lines originate in a control bus 47 of FIG. 3 which is connected between the microprocessor 27 and a chip select circuit 48, while the STROBE line is derived as an output of the clock and timing circuit 28.

The parity of information stored in the main memory 33 is checked by a parity checking circuit 49 of a type used in the prior processor module discussed above. The parity checking circuit 49 is coupled to the data bus 39 and when information is read into the main memory 29, a parity bit is calculated and stored in a line of the memory 29 with the data. When the same data is read out of the main memory 29, the parity bit is coupled to the parity checking circuit 49 which compares it to calculated parity of the information on the data bus 39. If a parity error is detected, a signal is generated on parity error (PE) line running from the parity checking circuit 49 to a status port 50. The status port 50 includes a latch for reading a number of inputs including the status of the parity error (PE) line.

Figure 4:
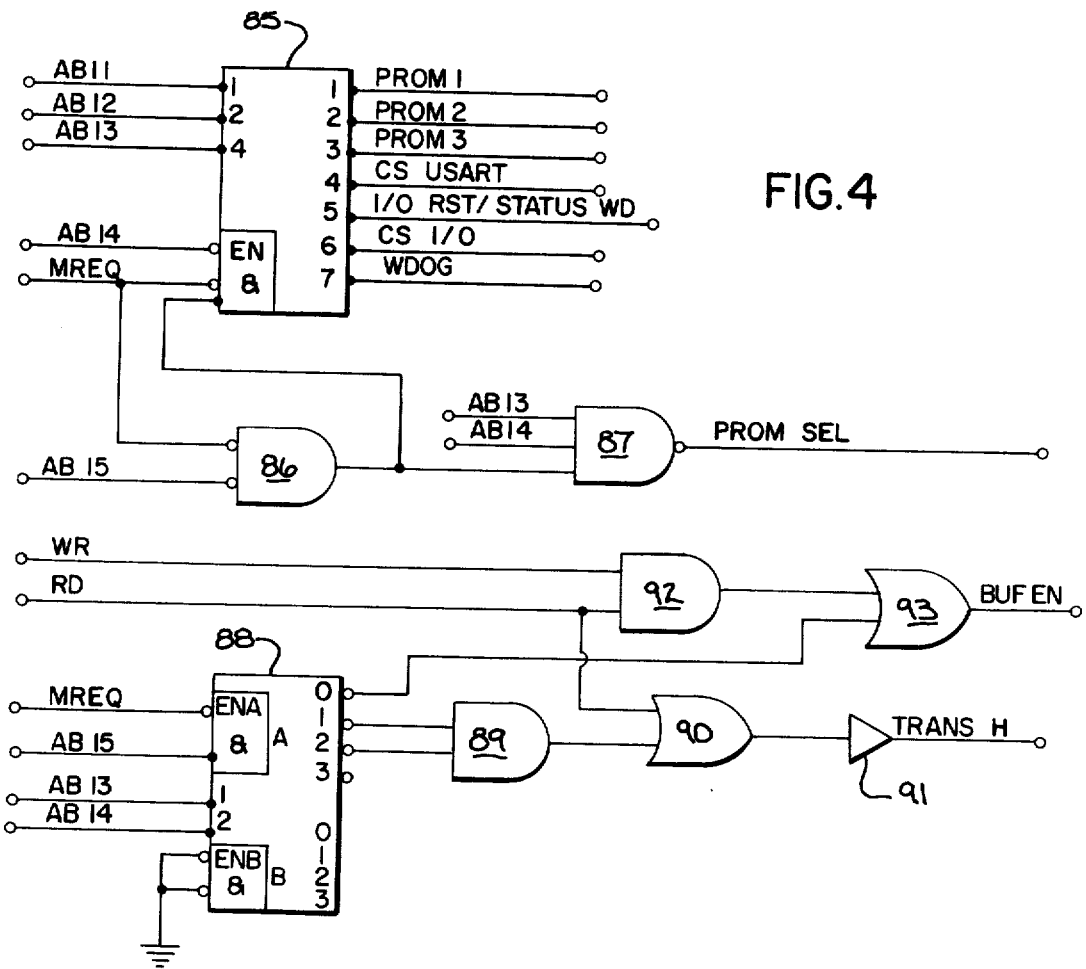
FIG. 4 is a more detailed schematic view of the chip select circuit of FIG. 3.

The circuit chips on the processor module 10 are enabled in response to control signals from the microprocessor 27 which are coupled through the chip select circuit 48 to the various other chips on the module 10. The microprocessor is connected to the chip select circuit 48 through lines A11-A14 of the address bus 34 and through the control bus 47. The control bus 47 includes the read (RD) line, the write (WR) line, the memory request (MREQ) line and other lines necessary to convey the control signals utilized by this type of microprocessor 27. As seen in FIG. 4, the chip select circuit 48 is basically a decoding circuit that includes a first three-to-eight-line decoder 85 for decoding signals on lines AB11-AB15 and the MREQ line to generate enabling signals to the interpreter memory 33 through the PROM 1, PROM 2 and PROM 3 lines, to enable to the programming unit interface circuit 42 through the CS USART line, to enable the status port 50 through the status word (STATUS WD) line, to enable the buffers through the CS I/O line and the BUF EN line, and to retrigger a watchdog timer 51 seen in FIG. 3 through a W DOG line and a NOR gate 52. FIG. 4 also shows the decoding of signals on address lines AB13-AB15 and the MREQ line through a low-true NOR gate 86 and a NAND gate 87 to control the PROM SEL line. And FIG. 4 also shows the control of the TRANS H line through a second decoder 88, an AND gate 89, an OR gate 90 and an inverter 91, and the control of the BUF EN line through the decoder 88, an AND gate 92 and an OR gate 93. The two-way buffers 40 are selected through the BUF EN line, while the translator memory 41 is selected through the TRANS H line.

In determining what address signals must be generated by the microprocessor 27 to couple enabling signals to the various chips and to various areas in memory, the following map of the address space for the microprocessor 27 will be helpful to those skilled in the art.

TABLE 2

Map of Main Microprocessor Address Space

| First Address in Range | Object of Address | Range (Hex) |
|---|---|---|
| 0K | Interpreter Memory | 0000H-177FH |
| 6K | P.U. Interface Circuit | 1800H-Data 1801H-Control/Status |
| 8K | I/O Reset/Processor Status Port | 2000H |
| 10K | I/O Modules | 2800H-2811H |
| 12K | Watchdog/Parity Port | 3000H |
| 14K | Scratchpad RAM | 3800H-3FFFH |
| 16K | Dual Language PROM | 4000H-4FFFH |
| 24K | Backup PROM | 6000H-6FFFH |
| 32K | Main Memory (Untranslated area) | 8000H-8FFFH |
| 40K | Main Memory (Translated area) | A000H-BFFFH |

The execution of control program macroinstructions has been improved in this processor module 10 by reducing the length of the fetch sequence for initiating each interpreter routine 32 to just two microinstructions. Thus, if the XIC 4 interpreter routine is again taken as an example, it would be made up of the assembly language microinstructions in Table 3 below, which would be stored in the interpreter memory 33 in their machine language equivalent form.

TABLE 3

Improved XIC 4 Interpreter Routine

| Instruction Mnemonic | Comment |
|---|---|
| POP DE | Load a 16-bit operand address from the location pointed to by the stack pointer register into the DE pair of registers. |
| RET NZ | Jump to fetch next user instruction if zero flag is reset. |
| LD A, (DE) | Load operand in A register. |
| CPL | Complement the contents of A register. |
| AND 10H | Perform logical "AND" of contents of A register and 10 (hexidecimal). |
| RET | Load the program counter with a 16-bit operation code by reading data from the locations pointed to by the stack pointer. |

The fetch sequence for an XIC 4 macroinstruction would include the last microinstruction in the preceding interpreter routine (the RET instruction) and the first microinstruction (POP DE) in the XIC 4 interpreter routine. The next instruction to be executed, the "RET NZ" instruction terminates the interpreter routine when the status of the current rung in the control program is false as a result of the execution of a prior user program instruction. As will be seen from examining the other instructions in the improved XIC 4 interpreter routine, if the result of the examining bit "4" is that the bit is "off" or "zero," then the execution of the "AND 10H" instruction will reset a zero flag in an internal flag register of the microprocessor 27. When the zero flag is reset, it signals a "false" result for a previously executed user program instruction, and execution of the RET NZ instruction causes the microprocessor 27 to jump to the next user program instruction to fetch an operation code rather than executing the remainder of the current interpreter routine. The RET NZ instruction is included in all of the interpreter routines 32. Where a "false" result in a simple rung is detected, the remaining user program instructions are fetched but not executed. Where the "false" result occurs in a branch of a complex rung the remaining user program instructions in that branch are fetched, but not executed. On the other hand, assuming that the zero flag is set as the result of executing a previous user program instruction, the "LD A, (DE)" instruction is executed next to load the operand into the A register (also called the accumulator). The contents of the A register are then complemented by executing the CPL instruction so that if bit "4" of the operand was a "1" it will now become a "0," and if it was a "0" it will now become a "1." When the logical "AND" operation is performed, the zero flag will be set if bit 4 of the operand was originally a "1." The zero flag will be reset if 4 of the operand was originally a "0." After examining bit 4, the operation code in the next user program instruction is fetched from the main memory 29 by executing the "RET" instruction. The RET instruction is commonly used by practitioners in the art to return from a subroutine call, however, its use here in coupling macroinstructions to interpreter routines of microinstructions is believed to be unique.

Referring to FIG. 3, the processor module 10 of the present invention expands the eight-bit operation code and the eight-bit operand address of each user macroinstruction to sixteen-bit words as they are fetched from the main memory 29. This is accomplished with the aid of the multiplexers 35-37. Both the POP and the RET instructions generate two successive and sequential addresses on the address bus 34. When line AB13 is active and the microprocessor 27 addresses the translated area of the main memory 29, the multiplexers 35-37 are in a shift mode that drops the AB0 line signal from the address being coupled to the main memory 29. The result is that for two consecutive addresses generated by the microprocessor 27, the same line is read from the main memory 29.

The two bytes of operation code and the two bytes of operand address that are read from the main memory 29 are coupled through the translator memory 41 to differentiate the high and low bytes of the operation code and the operand address. Address bus lines AB0 and AB1 are connected to the least significant address inputs A1 and A0, respectively, on the translator memory 41 and eight lines in the one-way portion of the data bus 39 connect data outputs on the main memory 29 to address inputs A2-A9 on the translator memory 41. For two consecutive addresses on lines AB0-AB13 the translation addresses to the translator memory 41 will be different, even though the addresses to the main memory 33 are the same. The two identical bytes of operation code read from the main memory 29 are translated into upper and lower bytes of the address of a corresponding interpreter routine 32. The two bytes of operand address are translated into upper and lower bytes of a data table address 34 in the main memory as seen by the microprocessor 27. Although both operand address bytes are coupled through the translator memory 41, only one is translated to a different bit pattern. The other byte is coupled to an address storing its own identity in data to provide a 1:1 mapping of data. Translation data is stored in interleaved fashion in the translator memory 41 with two lines of operation code data, and then two lines of operand address data, etc. The translation data for the operand address is not, however, necessarily stored adjacent the translation data for the operation code associated with that operand address in a particular user program instruction.

In executing an interpreter sequence pointed to by the operation code, the microprocessor 27 obtains the operand at the operand address in the untranslated area of the main memory 29. Operands are coupled to and from the data table 30 through the buffer 40, thereby bypassing the translator memory 41.

Referring to FIG. 5, the improved operation of the processor module 10 can perhaps be better understood by reviewing the sequence of events in executing the RET instruction to fetch the operation code for the XIC 4 macroinstruction. As the microprocessor 27 normally would be executing various instructions in the interpreter memory 33, the address in its program counter (PC) register would be incremented to the address at the RET instruction in FIG. 5. The microprocessor 27 then executes a microinstruction FETCH of an operation code for the RET instruction and loads it into an internal instruction register and decoder. The RET instruction is decoded to perform two operations.

In its first operation, the RET instruction loads the contents of a location addressed by its SP register into the lower half of its PC register. In this example, however, the address pointed to by the SP register is external to the microprocessor 27—in the main memory 29. Furthermore, this address, except for the AB0 bit, is coupled through multiplexers 35-37. The SP register will be pointing to the location of the XIC 4 operation code in the main memory 29, having been incremented to that address after previously addressing an operand address associated with that operation code and stored one line below it in the main memory 29. When the XIC 4 operation code is addressed, it is read into the translator memory 41 with the AB0 bit also being coupled to the translator memory to select a line in which the low byte of the translated and expanded operation code is stored. This byte is coupled to the lower half of the PC register.

In its second operation, the RET instruction increments the stack pointer register to an SP+1 address. For clarity, this address has been shown as a separate element in FIG. 5, although it is not a separate register. This address is coupled through the multiplexers 35-37, and for the reasons explained previously will address the same line in the main memory 29 as the previous address. The XIC 4 operation code will therefore be read again from the main memory 29 into the translator memory 41, however, the signal on the AB0 line will select a different line of the translator memory to couple a high byte of the translated and expanded operation code into the upper half of the PC register.

After the RET instruction has been executed in this manner, the PC register holds a sixteen-bit address of the first location in the XIC 4 interpreter routine in the interpreter memory 33. Referring again to Table 3, at the end of the XIC 4 interpreter routine that ends with a "true" result the RET instruction is executed again to fetch the next user program instruction from the main memory 29 and couple it to its interpreter routine in the interpreter memory 33.

Using the improved macroinstruction FETCH sequence cuts fetch time from 10 microseconds to 6 microseconds. A typical control program 31 that utilizes the maximum allowable memory space in the main memory 29 would have approximately 1800 instructions, and the savings in program execution time would then be 7.2 milliseconds, or roughly 20% of the total program execution time. That execution time is based on a probability that 40% of the rungs are false, and where a greater number are false additional macroinstructions will be fetched but then skipped, with a further saving in execution time. The above-described arrangement also eliminates the need for the jump table in the interpreter memory 33 because a sixteen-bit operation code is loaded directly into the program counter (PC) register. In the prior processor module an eight-bit operation code was fetched, and the jump table was used for access to a larger area of the interpreter memory than was accessible with only eight-bit addresses.

The main memory 29 is made up of random-access memory (RAM) chips to allow relatively fast access for both reading and writing data. This type of memory is best suited for storing the data table 30, in which the contents are rapidly changing, and for storing the control program, which may be edited often during the time it is being developed. The processor module 10 also includes an EPROM socket 54 for inserting a chip of erasable, programmable read-only memory (EPROM), which can be programmed electrically and erased by an application of ultraviolet light. The chip is provided with a window for this purpose. The module 10 is removed from the rack 12 for an erase operation. The EPROM is a nonvolatile memory, which retains its contents during power loss or interruption, whereas the contents of the main memory 29 would be lost, unless supplied with power from a back-up battery.

To write data into an EPROM chip in the EPROM socket 54 requires a d-c voltage higher than the normal 5-volt or logic level d-c voltage. With an EPROM chip suggested for this embodiment, a 21-volt d-c voltage is required, and this voltage must be applied for a period of fifty milliseconds to write information into the EPROM. Before data can be transferred into the EPROM, the microprocessor 27 determines whether a source of EPROM programming voltage is present. Referring to FIG. 1, the source of EPROM programming voltage is the auxiliary power supply 24, which is connected via a wall plug 24a to a source of 120-volt a-c voltage, and which is connected through the Y-cable 18 to the connector 23 on the processor module 10. Referring to FIG. 3, one of the pins in the connector 23 is connected to an inverting input on a comparator, which together with an appropriate biasing network forms a comparator circuit 59. A logic level d-c reference voltage is connected to the noninverting input on this comparator and when a 25.5-volt d-c signal is provided by the auxiliary power supply 24, the output of the comparator circuit 59 is pulled low to generate a logic level signal to an input on the status port 50.

It will be apparent to those skilled in the art that the auxiliary power supply 24 and the programming terminal 16 can be connected to the processor module 10 in various ways in other embodiments of the invention. Two connectors of a type similar to connector 23 can be used to independently connect these circuits to the processor module 10, or the auxiliary power supply 24 can be located within the programming terminal 16. For either of these optional embodiments, the power supply voltage is coupled to the comparator circuit 59 shown in FIG. 3.

To write a user program into an EPROM chip in the EPROM socket 54, the microprocessor 30 executes a PROM BURN IN routine, which is stored with a group of initialization routines 60 in the interpreter memory 33. Each time the processor module 10 is powered up, or reinitialized after a fault condition, the microprocessor 27 executes the instructions in a SYSCK initialization routine, seen in relevant part in Appendix A, to read a status word through the status port 50, thereby determining whether a source of programming voltage (the auxiliary power supply 24) is connected. If so, the microprocessor 27 jumps to the PROM BURN IN routine given in Appendix A to determine whether the EPROM chip is in an "erased" condition and whether there is a control program 31 in the main memory 29 that should be written into the chip in the EPROM socket 54.

When executing instructions in the PROM BURN IN routine, the microprocessor 27 generates control signals on the READ line, the WRITE line and the PROM SELECT (PROM SEL) line, the latter being derived from the chip select circuit 48. These signals are coupled to an EPROM control circuit 55. Referring to the detailed schematic of this circuit 55 in FIG. 6, the WRITE line and the PROM SEL Line are coupled through an OR gate 56 to an A input on a MV1 multivibrator. The B input of the MV1 multivibrator is connected through a pull-up resistor 57 to a source of logic high level d-c voltage. A Q output on the MV1 multivibrator is connected through one inverter 58 with an open-collector output to a WAIT L line going to a WAIT input seen on the microprocessor 27 in FIG. 3. The Q output of the MV1 multivibrator is also connected through another inverter 61 with open-collector output and through a resistor 62 to the base of a PNP transistor 63. This transistor 63 has its base and emitter connected through respective biasing resistors 64 and 65 to the 25.5-volt d-c voltage provided by the auxiliary power supply 24. The collector of this transistor 63 is connected to an input on a voltage regulator 66 and associated biasing network (not shown). The function of the voltage regulator 66 is to step down the 25.5-volt d-c voltage to the 21-volt programming voltage. This voltage is coupled to the EPROM socket through the PV line seen in FIGS. 3 and 6.

The WRITE and PROM SEL lines are also coupled through the OR gate 56 to an A input on an MV2 multivibrator, and this chip has its Q output connected to an A input on a MV3 multivibrator. The inputs on both of these multivibrators MV2 and MV3 are connected through pull-up resistors 67 and 68 to a source of logic high level d-c voltage. The Q output on the MV3 multivibrator is connected through an EPROM write (EPROM WR) line to a chip in the EPROM socket 54 to enable the programming of the chip. When the WRITE and the PROM SEL lines are active, the enable signal and the 21-volt programming voltage are coupled to the chip in the EPROM socket 54 for a period determined by the operation of the multivibrators MV1-MV3. Multivibrator MV1 is provided with an appropriate biasing circuit to generate a pulse of 65–70 milliseconds in duration. The pulse is coupled from the Q output of the MV1 multivibrator to the WAIT L line to hold an address that has been generated by the microprocessor 27 on the address bus for a period of time to allow the programming voltage to "burn in" a line of data into the chip in the EPROM socket 54. The MV2 and MV3 multivibrators are operated in response to a signal coupled through the OR gate 56 to provide a pulse of approximately fifty milliseconds on the EPROM WR line during which the programming voltage is applied to a line in the EPROM chip. The WAIT signal to the microprocessor 27 is then removed by coupling a signal on the WAIT H line and an inverter 69 (open-collector output) to the WAIT L line. The outputs of the inverters 58 and 69 are connected in "wired OR" fashion so that when either receives a low input, it will generate a logic high signal on the WAIT L line.

Once the EPROM chip has been programmed, its contents are read by generating signals on the PROM SEL line and the READ line which are coupled through a pair of NOR gates 70 and 71 to an EPROM enable (EPROM EN) line.

Figure 7:
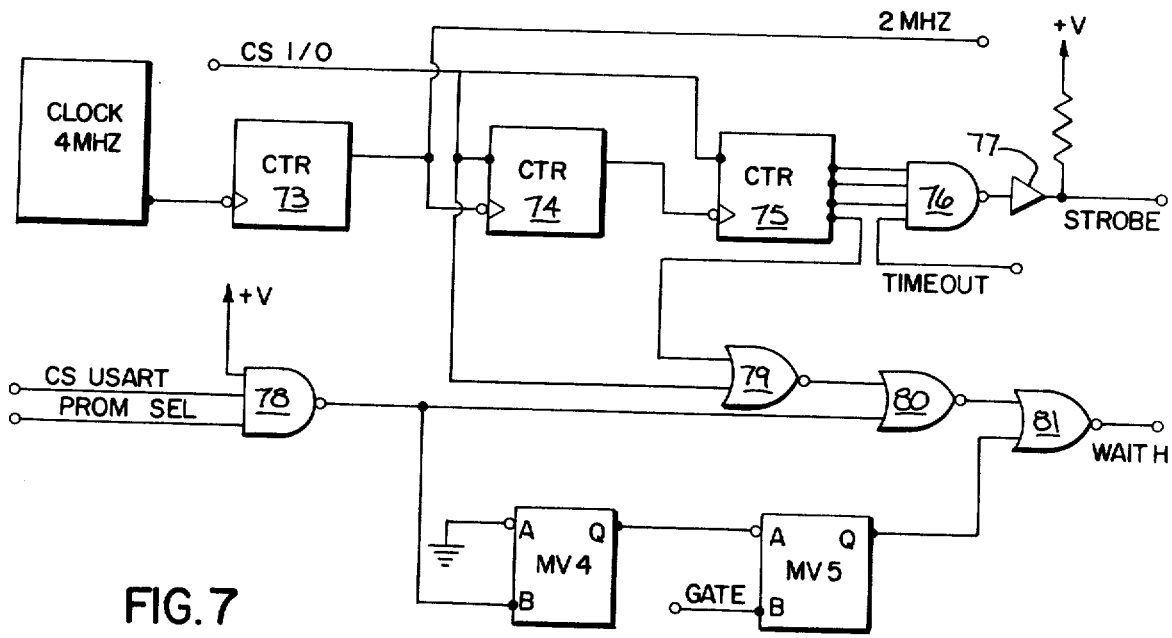
FIG. 7 is a more detailed schematic view of the clock and timing circuit of FIG. 3.

Referring to FIG. 7, the clock and timing circuit 28, which controls the state of the WAIT H line in the EPROM control circuit 55 and generates timing signals to the microprocessor 27, includes a clock crystal circuit 72 that generates pulses at a frequency of four megahertz (4 MHZ) at its output. The clock output is connected to a divide-by-sixteen counter 73 connected to operate as a divide-by-two counter to divide the frequency to 2 MHZ. The 2 MHZ signal is coupled to an input of the USART in the programming unit interface circuit 42 in FIG. 3 and to the clock input of a second counter 74. This second counter 74 is enabled by a signal on the CS I/O line, which is also coupled to an enable input on a third counter 75. The third counter 75 receives a 1 MHZ signal at its clock input and generates a STROBE pulse through a NAND gate 76 and inverter 77. The third counter 75 has its "0-2" outputs coupled through three inputs of the four-input NAND gate 76. A TIMEOUT Line couples a signal from the watchdog timer circuit 51 to the fourth input of the NAND gate 76 to disable the STROBE line in the event of a watchdog time out.

The WAIT H line is controlled by the CS I/O line, the CS USART line and the PROM SEL line. The CS USART and PROM SEL lines are coupled through a NAND gate 78 to a second NOR gate 80 in a group of three NOR gates 79-81. The CS I/O line and the "3" output of the third counter 75 are coupled through the first NOR gate 79 to another input on the second NOR gate 80. The output of the NAND gate 78 is coupled to a B input on a MV4 multivibrator that has its A input grounded. The Q output of this MV4 multivibrator is connected to the A input of an MV5 multivibrator which is enabled by a GATE signal coupled from the Q output of the MV1 multivibrator in FIG. 6 to the B input of the MV5 multivibrator in FIG. 7. The Q output of the MV5 multivibrator is coupled with the output of the second NOR gate 80 through third NOR gate 81 to the WAIT H line. The MV4 and MV5 multivibrators function to remove the WAIT signal at the input of the microprocessor 27 after a time of approximately 60 milliseconds and after the WRITE pulse has been removed from the chip in the EPROM socket 54.

Figure 6:
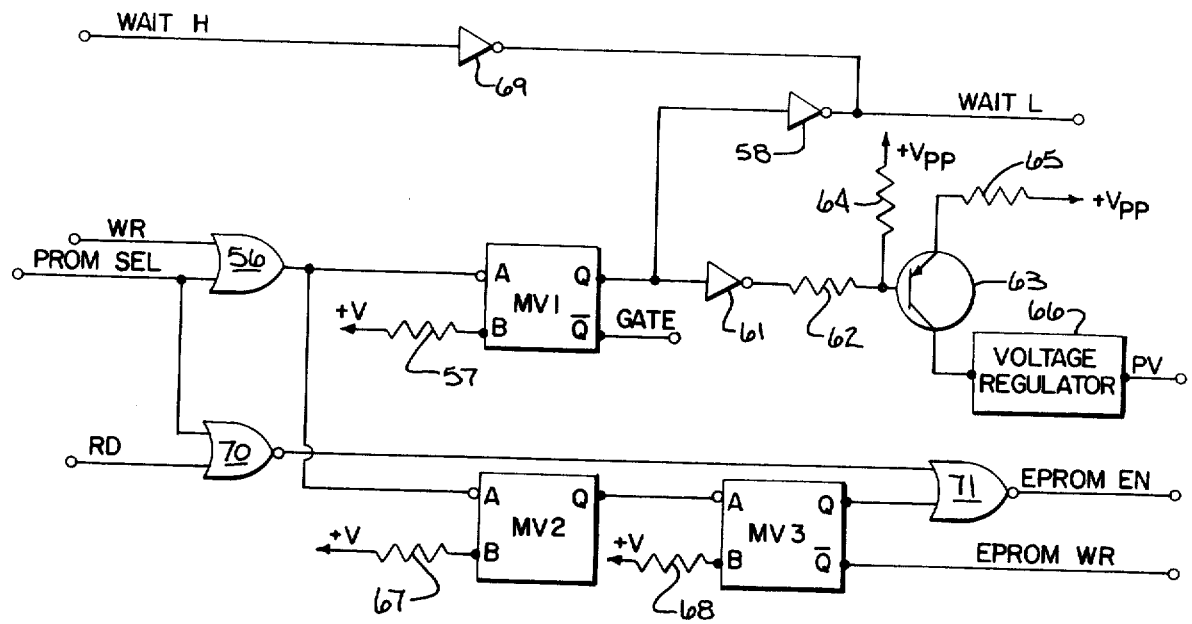
FIG. 6 is a more detailed schematic view of the EPROM control circuit of FIG. 3.

Referring to FIG. 3, it will be seen that the connection of the auxiliary power supply 24 is sensed through the status port 50 and a programming voltage $V_{PP}$ from the auxiliary power supply 24 is coupled through the circuit in FIG. 6 to burn a user control program into an EPROM chip in the EPROM socket 54. By interfacing the processor module 10 with this auxiliary power supply 24, a convenient arrangement is provided for supplying the extra power requirements of programming a non-volatile back-up memory without adding to the size and complexity of the processor module.

The PROM-burning capability of the processor module 10 can also be expanded to load user programs in a second program language into the EPROM. In the preferred embodiment, the main memory 29 includes 4k bytes of read/write random access memory (with an additional 4k × 1-bit area for parity), while the preferred EPROM (identified in Appendix B) is a chip for storing 8k bytes of information. The EPROM chip is inserted into the EPROM socket 54 when in use and is easily removed if replacement is necessary.

Whereas the user program in the ladder diagram language is loaded automatically after the auxiliary power supply 24 is connected and certain other conditions have been satisfied, the manner of loading a second program language has not, heretofore, been directed by the processor module 10. The second language programs have been developed using computer based development systems, translated to the machine code, and then used to make a corresponding mask that can be used to burn in or manufacture the 8k-byte chip with 4k bytes of pre-programmed object code. Access to the machine code routines is provided by user-defined macroinstructions stored in the main memory 29 with the first user program language, which is at a macroinstruction level. The manner in which the processor module 10 executes a user program in machine language is explained in more detail in Struger et al, U.S. Pat. No. 4,302,820, issued Nov. 24, 1981.

A PROM-burning routine similar to the one in Appendix A can be used to load the machine code user program into the EPROM provided that the following modifications are made. The routine in Appendix A is called to load the user control program of macroinstructions into the EPROM unless the user program in the main memory 29 has been found to be invalid (absent or erroneous), and unless a valid program is not present in the EPROM. The machine language program, however, is similar to the interpreter routines 32 in the interpreter memory 33, and will be executed out of the EPROM, rather than reloaded to the main memory 29 for execution.

The development of the machine language user programs can be accomplished with a programming terminal 16 described in a copending application of Galdun et al, Ser. No. 186,254, filed Sept. 11, 1980. There, the terminal 16 was used for entering macroinstructions in the higher level user program language. By providing the same type of functional blocks of firmware, the terminal can be used to develop the assembly language programs. An application task can be provided with blocks of firmware for assembly language programming, including an entry and editing block of firmware, one or more blocks to interpret user commands, a communication protocol block for coupling commands to the processor module 10 and for receiving status information in return, and utilities to handle keyboard inputs and display of the program instructions. In addition, an assembler block of firmware can be provided, to translate program instructions from assembly language into hexadecimal code and finally into object or machine code, prior to its communication to the processor module 10. For further assistance to the user, diagnostic or "debug" blocks of firmware can also be provided to check the program before transfer to the processor module 10.

To load the user machine language program into the EPROM, it is first coupled from the programming terminal 16 to read/write main memory 29, which is used as a buffer, prior to storage of user macroinstructions in the first program language. The user machine language program is therefore normally developed prior to the user program in the higher level language, and the macroinstructions to be interpreted by the machine language programs are then included in the program of macroinstructions. To prevent writing over a user program of macroinstructions while the main memory 29 is being used as a buffer, the user-operated mode switch 22 is connected to the status port 50 and examined by the microprocessor 27 during "start-up" to detect one of two selectable programming modes. The first programming mode is the typical mode for loading macroinstructions into the main memory 29. A second programming mode is provided by another position on the switch 22 to signal the loading of a user machine language program. In this second mode, conventional program loading will be inhibited until the machine language program has been loaded in the EPROM. Such a special programming mode may provide for transfer of conventional user control programs to a tape or other peripheral storage device, if necessary, to preserve them while the machine language programs are being loaded.

While the second language has been described herein as machine language, it will be apparent to those skilled in the art that such programs might be entered into the terminal 16 in a higher level language such as BASIC. In translating the program instructions to a machine code, the blocks of firmware in the terminal 16 would require additional memory to perform the necessary editing, assembling and debugging, however, the size and utilization of memory in such a terminal 16 is optional. The terminal of Ser. No. 186,254, described above is particularly adapted for such an application, since it has interchangeable application modules, each of which has its own set or sets of keyboard symbols and corresponding application task firmware.

With the present invention the processor module 10 has been provided with on-board PROM-burning capability for loading machine code as well as higher level user language instructions into nonvolatile memory. This is intended to save customers the cost of external PROM-burning devices and development systems. This concept has broader application, however, and therefore the scope of the invention has been reserved for the following claims.

APPENDIX A
Firmware Assembly Listing

| Location (Hex) | Contents (Hex) | Label | Mnemonic | Comment |
|---|---|---|---|---|
| | | SYSTEM CHECK ROUTINE | | |
| 00CB | 310039 | SYSCK | LD SP,USTAK | SET UP STACK |
| 013E | 3A0020 | | LD A, (STATP) | |
| 0141 | CB4F | | BIT 1,A | BURN PROM? |
| 0143 | 2086 | | JR, NZ,SYSCK | |
| 0145 | C30000 | | JP PRMBRN | SIGNAL LOW - TRUE |
| | | PROM BURN ROUTINE | | |
| 46A3 | 3A0100 | PRMBRN | D A, (STATUS+1) | READ PRONM STATUS |
| 46A6 | A7 | | AND A | |
| 46A7 | C20000 | | JP NZ,SYSCK | PROM SYSTEM? |
| 46AA | 08 | | EX AF,AF' | A' = 0 |
| 46AB | 3A0100 | | LD A,(PTEST+1) | READ PROM TEST CODE TO CHECK IF PROM IS OK WITHOUT ERASING |
| 46AE | FEAA | | CP 0AAH | |
| 46B0 | CA3047 | | JP Z,BRNERR | |
| 46B3 | D9 | | EXX | USE ALTERNATE REGS |
| 46B4 | 212060 | | LD HL,6020H | PROM ADDRESS |
| 46B7 | 110000 | | LD DE,IMAG | RAM ADDRESS |
| 46BA | 06E0 | | LD B,0E0H | INITIAL COUNT |
| 46BC | 1A | BURN1 | LD A,(DE) | GET RAM DATA |
| 46BD | CD1C47 | | CALL BURN | BURN LOCATION |
| 46C0 | 23 | | INC HL | |
| 46C1 | 13 | | INC DE | NEXT ADDRESSES |
| 46C2 | 7D | | LD A,L | ADDRESS BIT 3 WILL TURN PARITY LED ON AND OFF |
| 46C3 | E608 | | AND 8 | |
| 46C5 | 4F | | LD C,A | |
| 46C6 | 78 | | LD A,B | |
| 46C7 | 0630 | | LD B,30H | BC=PARITY ADDR. |
| 46C9 | 02 | | LD (BC),A | |
| 46CA | 47 | | LD B,A | RESTORE B |
| 46CB | 10EF | | DJNZ BURN1 | |
| 46CD | 3A0000 | | LD A,(RAMEND) | LOOKING FOR LAST RAM ADDRESS |
| 46D0 | 3C | | INC A | |
| 46D1 | BA | | CP D | |
| 46D2 | 20E8 | | JR NZ,BURN1 | |
| 46D4 | 2660 | | LD H,60H | RESET ADDRS. |
| 46D6 | 1680 | | LD D,80H | |
| 46D8 | 1A | | LD A,(DE) | GET RAM DATA |
| 46D9 | CD1C47 | | CALL BURN | BURN LOCATION 0 |
| 46DC | C6AA | | ADD A,0AAH | |
| 46DE | C655 | | ADD A,55H | START CHECKSUM OPER. |
| 46E0 | 1E20 | | LD E,20H | |
| 46E2 | 06E0 | | LD B,0E0H | |
| 46E4 | EB | | EX DE,HL | HL=RAM ADDR |
| 46E5 | 1E05 | | LD E,5 | DE=6005H |
| 46E7 | 0E04 | BURN2 | LD C,4 | |

APPENDIX A
Firmware Assembly Listing

| Location (Hex) | Contents (Hex) | Label | Mnemonic | Comment |
|---|---|---|---|---|
| 46E9 | 86 | BURN3 | ADD A,(HL) | ADD VALUE FOR SUM |
| 46EA | 23 | | INC HL | |
| 46EB | 10FC | | DJNZ BURN3 | |
| 46ED | 0D | | DEC C | DO 1K CHECKSUMS |
| 46EE | 20F9 | | JR NZ,BURN3 | |
| 46F0 | EB | | EX DE,HL | |
| 46F1 | CD1C47 | | CALL BURN | BURN CHECKSUM |
| 46F4 | EB | | EX DE,HL | HL=RAM ADDR. |
| 46F5 | 1C | | INC E | |
| 46F6 | 3A0000 | | LD A,(RAMEND) | |
| 46F9 | 3C | | INC A | |
| 46FA | BC | | CP H | LOOK FOR RAM END |
| 46FB | 2803 | | JR Z,BURN4 | |
| 46FD | AF | | XOR A | |
| 46FE | 18E7 | | JR BURN2 | |
| 4700 | 0630 | BURN4 | LD B,30H | TURN PORT FUNCTIONS BACK ON VIA A WRITE |
| 4702 | 3A0000 | | LD A,(FLAG2) | |
| 4705 | 4F | | LD C,A | |
| 4706 | 02 | | LD (BC),A | |
| 4707 | 210260 | | LD HL,6002H | |
| 470A | 3E55 | | LD A,55H | |
| 470C | CD1C47 | | CALL BURN | BURN IN TEST CODES |
| 470F | 2C | | INC L | |
| 4710 | 2F | | CPL | |
| 4711 | CD1C47 | | CALL BURN | BURN HIGH BYTE |
| 4714 | 3E01 | | LD A,1 | |
| 4716 | 320100 | | LD(STATUS+1), | A LOAD PROM STATUS |
| 4719 | C30000 | | JP SYSCK | |
| 471C | 0E05 | BURN | LD C,5 | TRY 5 TIMES |
| 471E | 77 | | LD (HL),A | BURN LOCATION |
| 471F | D9 | | EXX | |
| 4720 | 08 | | EX AF,AF' | MUST DELAY FOR 10MS SO THAT THE 221 HAS TIME TO CATCH ITS BREATH |
| 4721 | 0E0A | | LD C,10 | |
| 4723 | 3D | BURNI | DEC A | |
| 4724 | 20FD | | JR NZ,BURNI | |
| 4726 | 0D | | DEC C | |
| 4727 | 20FA | | JR NZ,BURNI | |
| 4729 | 08 | | EX AF,AF' | RESTORE DATA |
| 472A | D9 | | EXX | |
| 472B | BE | | CP (HL) | IS IT CORRECT? |
| 472C | C8 | | RET Z | YES,RETURN |
| 472D | 0D | | DEC C | |
| 472E | 20EE | | JR NZ,BURN+2 | TRY AGAIN |
| 4730 | 320830 | BRNERR | LD (3008H),A | TURN LED ON |
| 4733 | 76 | | HALT | |
| 4734 | | | END | |

APPENDIX B
Component Listing

| Component | Reference Number | Description |
|---|---|---|
| Microprocessor | 27 | Z80A-CPU Manufactured by Zilog, Inc. |
| Main memory | 29 | Nine HMI 6504 4096 × 1-bit CMOS random access memory manufactured by Harris Corp. |
| Decoder | 26 | Two SN74LS138 3-line-to-8-line decoders manufactured by Texas Instruments, Inc. |
| Interpreter | 32 | Three 82S191 2k × 8-bit programmable read only memories manufactured by Signetics Corporation |
| Multiplexers | 35–37 | Three SN74LS257 quad 2-line-to-1-line data selectors/multiplexers manufactured by Texas Instruments, Inc. |
| Inverter | 38 | SN74LS04 hex inverters manufactured by Texas |

APPENDIX B
Component Listing

| Component | Reference Number | Description |
|---|---|---|
| Two-way buffers | 40 | Instruments, Inc. 8304 octal bidirectional buffers/line drivers manufactured by National Semiconductor, Inc. |
| Translator memory | 41 | 82S181 1k × 8-bit programmable read only memory manufactured by Signetics |
| USART in programmable unit interface | 42 | 8251 programmable communication interface chip manufactured by Intel Corporation |
| Two-way buffers | 45 | 8304 octal bidirectional buffers/line drivers manufactured by National Semiconductor, Inc. |
| Parity checker | 49 | SN74LS280 9-bit odd/even parity generator/checker manufactured by Texas Instruments, Inc. |
| Status port | 50 | SN74LS244 octal buffer/line drivers/line receivers manufactured by Texas Instruments, Inc. |
| Watchdog timer | 51 | SN74123 dual retriggerable monostable multivibrator and SN7474 dual D-type flip flop manufactured by Texas Instruments, Inc. |
| NOR gate | 52 | SN7402 quad 2-input positive NOR gates manufactured by Texas Instruments, Inc. |
| OR gate | 56 | SN7432 quad 2-input positive OR gates |
| Multivibrators | MV1, MV2, MV3 | Two SN74221 dual monostable multivibrators manufactured by Texas Instruments, Inc. |
| Inverters | 58, 61, 69 | SN7406 hex inverters with open-collector high voltage outputs manufactured by Texas Instruments, Inc. |
| Voltage regulator | 66 | MC78L12 d-c voltage regulator manufactured by Motorola Semiconductor Products, Inc. |
| NOR gates | 70, 71, 86 | SN7402 quad 2-input positive NOR gates manufactured by Texas Instruments, Inc. |
| Counters | 73, 74, 75 | Two SN74393 dual 4-bit binary counters manufactured by Texas Instruments, Inc. |
| NAND gate | 76, 78 | SN74LS20 dual 4-input positive NAND gates manufactured by Texas Instruments, Inc. |
| Inverter | 77 | SN7407 hex buffers/drivers to open and collect outputs |
| NOR gates | 79, 80, 81 | SN7402 quad 2-input positive NOR gates manufactured by Texas Instruments, Inc. |
| Multivibrators | MV4, MV5 | SN74221 dual monostable multivibrators |
| Dual 2-to-4-line decoder | 88 | SN74155 dual 2-line-to-4-line decoder manufactured by Texas Instruments, Inc. |
| AND gate | 89, 92 | SN7408 quad 2-input positive AND gates |
| Inverter | 91 | SN7404 hex inverters manufactured by Texas Instruments, Inc. |
| OR gates | 90, 93 | SN74LS32 quad 2-input positive-OR gates manufactured by Texas Instruments, Inc. |
| NAND gate | 87 | SN7410 triple 3-input positive NAND gates |
| EPROM for use in EPROM socket | 54 | manufactured by Texas Instruments, Inc. 2764 8k × 8-bit UV erasable, programmable read-only memory manufactured by Intel Corp. |

We claim:

1. An improved processor for a programmable controller of the type having an I/O interface for connection to a plurality of I/O devices, wherein the processor has first memory means that stores data relating to the status of the I/O devices, wherein the processor also has means for coupling the first memory means and I/O interface enabling transfer of the status data between the first memory means and the I/O interface, and wherein the improvement in the processor comprises:

second memory means for storing user program instructions for operating on the status data, wherein each user program instruction includes a two-segment operation code;

third memory means for storing machine instructions organized in interpreter routines which are associated with corresponding operation codes for respective user program instructions, the third memory means also storing a machine fetch instruction for reading both segments of a selected one of the operation codes; and microelectronic processor means having a machine instruction pointer register coupled to the third memory means to generate address signals thereto, and having a stack pointer register that is coupled to the second memory means to generate address signals thereto, the microelectronic processor means generating address signals to the third memory means to read machine instructions, and the microelectronic processor means being responsive to reading the machine fetch instruction stored in the third memory means to generate address signals from the stack pointer register to the second memory means to read the segments of the selected one of the operation codes into its machine instruction pointer register and to thereafter execute the interpreter routine in the third memory means that is pointed to by that operation code.

2. The improved processor module of claim 1, wherein:

the second memory means includes two portions with address inputs, a first portion for storing user program instructions with unexpanded operation codes and a second portion electrically connected to the first portion to be addressed by the unexpanded operation codes from the first portion, the second portion storing expanded operation codes at addresses which are addressable by the unexpanded operation codes and a least significant address signal from the microelectronic processor means;

further comprising multiplexing means electrically connected to the address inputs on the first portion of the second memory means for selectively coupling incoming address signals thereto without the least significant address signal, so that two successive incoming addresses are coupled to the location of a single unexpanded operation code in the first portion of the second memory means; and wherein the microelectronic processor means is responsive to the machine fetch instruction stored in the third memory means to generate a first address which is coupled to the second portion of the second memory means along with the least significant address signal, to read a first portion of an expanded operation code into its machine instruction pointer register, and wherein the microelectronic processor means is further responsive to the machine fetch instruction to generate a second address which is coupled to the second portion of the second memory means along with the least significant address signal, which has changed state since the generation of the first address, to read a second portion of the expanded operation code into its machine instruction pointer register, in preparation for executing the interpreter routine in the third memory means that is pointed to by the expanded operation code.

3. An improved processor for a programmable controller of the type having an I/O interface for connection to a plurality of I/O devices, wherein the processor has first memory means that stores data relating to the status of I/O devices, wherein the processor has means for coupling the first memory means and I/O interface enabling transfer of status data between the first memory means and the I/O interface to monitor and control the I/O devices, wherein the improvement in the processor comprises:

second memory means for storing different types of user program instructions, the second memory means having a plurality of address inputs and each type of user program instruction having a respective unexpanded operation code;

multiplexing means electrically connected to the address inputs on the second memory means for selectively coupling incoming address signals to the second memory means without the least significant address signal, so that two successive incoming addresses are coupled to a single location in the second memory means;

third memory means for storing machine instructions organized in interpreter routines corresponding to different types of user program instructions, the third memory means also storing a machine fetch instruction for coupling each user program instruction to its respective interpreter routine;

fourth memory means electrically connected to the second memory means to be addressed by the unexpanded operation codes read from the second memory means, and electrically connected to receive the least significant address signal, the fourth memory means storing expanded operation codes in areas that are addressed by the unexpanded operation code; and microelectronic processor means coupled to the third memory means to read the machine fetch instruction, the microelectronic processor means being responsive to the machine fetch instruction to generate two successive addresses that are each coupled by the multiplexing means and the second memory means to address the fourth memory means, the microelectronic processor means generating a first, least significant address signal with the first of the two successive addresses to read a first portion of an expanded operation code from the fourth memory means, and the microelectronic processor means generating a second, least significant address signal with the second of the two successive addresses to read a second portion of the expanded operation code from the fourth memory means, and the microelectronic processor means having a machine instruction pointer register for receiving the two portions of the expanded operation code to provide the address of the next machine instruction to be executed.

4. The improved processor claim 3 wherein:

at least one of the program instructions in the second memory means includes an unexpanded operand address;

wherein the fourth memory means is also addressed by the unexpanded operand address as it is read from the second means;

wherein the fourth memory means also stores an expanded operand address at locations addressed when the unexpanded operation address is read from the second memory means;

wherein the third memory means stores a second machine fetch instruction; and wherein the microelectronic processor means has an address pointer register and is responsive to the second machine fetch instruction to generate two successive addresses that are each coupled by the multiplexing means and the second memory means to address the fourth memory means to read first and second portions of an expanded operand address into the address pointer register.

5. The programmable controller of claim 3, wherein the first memory means and the second memory means are both parts of a main memory.

6. The programmable controller of claim 3, wherein the recited improvement is contained within a processor module inside a rack assembly with the I/O interface.

7. An improved processor for a programmable controller of the type having an I/O interface for connection to a plurality of I/O devices, wherein the processor has a first memory means that stores data relating to the status of the I/O devices, wherein the processor also has means for coupling the first memory means and the I/O interface enabling the transfer of the status data between the first memory means and the I/O interface, and wherein the improvement in the processor comprises:

second memory means for storing user program instructions which are executed in a sequence that is characterized by a true-false logic status, wherein each user program instruction includes an operation code;

third memory means for storing machine instructions organized in interpreter routines that are associated with corresponding operation codes for respective user program instructions, wherein each interpreter routine includes a conditional machine fetch instruction for reading an operation code for a next user program instruction when the logic status of the user program instruction sequence is false; and microelectronic processor means having a flag register in which the logic status of previously executed user program instructions in the sequence is stored, having first addressing means coupled to the second memory means for fetching user program instructions, having second addressing means coupled to the third memory means for fetching machine instructions including the conditional machine fetch instruction, and having means coupled to the flag register that is responsive to the conditional machine fetch instruction to enable the first addressing means to fetch the operation code for the next user program instruction when the logic status of the previously executed user program instructions in the sequence is false, thereby skipping the execution of any machine instructions in the interpreter routine that follow the conditional machine fetch instruction.

8. In a programmable controller of the type with a main memory that stores control program instruction information and has n address inputs and with a microelectronic processor means for generating multibit addresses through a multiline address bus to the main memory and for reading the control program instructions through a data bus, the combination therewith of;
multiplexing means with n outputs coupled to the n address inputs on the main memory, with n+1 inputs coupled to n+1 lines in the address bus to receive addresses from the microelectronic processor means and with a control input coupled to the microelectronic processor means to receive a select signal therefrom when the microelectronic processor means generates an address in a first range of addresses, the multiplexing means being responsive to the select signal to drop the least significant bit of the incoming address and to couple the remaining bits of the address to the address inputs on the main memory to read the control program instruction information therefrom so that, for two successive processor-generated addresses in the first range, the same control program instruction information is read from the main memory,
whereby the microelectronic processor means is provided with a first address range with twice as many addresses as the number of locations in the main memory from which control program instruction information is read.

9. The programmable controller of claim 8, wherein:
the microelectronic processor means also generates addresses within a second range of addresses; and
wherein the multiplexing means is responsive to such addresses to retain the least significant bit and drop the most significant bit of the address received through the n+1 lines of the address bus so that only the remaining bits of the address are coupled to the main memory,
whereby the microelectronic processor means is provided with a combined address range with three times as many addresses as the number of locations in the main memory from which control program instruction information is read.

10. The programmable controller of claim 8, further comprising:
a translator memory having a plurality of address inputs coupled to data oupts on the main memory and having a plurality of data outputs coupled to the data bus;
wherein the microelectronic processor means is coupled to the least significant address input on the translator memory and to an enable input on the translator memory; and
wherein the microelectronic processor means generates an address to couple an enable signal to the enable input on the translator memory and to couple an address signal to the least significant address input on the translator memory, so that although the same user program instruction information is read from the main memory for two successive addresses, two different locations in the translator memory will be addressed to couple two different words to the microelectronic processor means through the data bus.

11. An improved programmable controller having a processor module with a read/write volatile memory that stores program instructions, with a connector adapted to couple the processor module to a programming terminal and with microelectronic processor means coupled to the volatile memory and coupled to the connector for receiving user program instructions from the programming terminal, wherein the improvement comprises:
a socket on the processor module that is adapted to electrically connect a nonvolatile memory to the microelectronic processor means;
a firmware memory on the processor module which stores firmware instructions to direct the transfer of user program instructions in either of two program languages to the nonvolatile memory from the volatile memory, the firmware memory being coupled to the microelectronic processor means;
program mode means on the processor module for selecting a first programming mode in which user program instructions in a first program language are loaded into the nonvolatile memory and a second programming mode in which user program instructions in a second user program language are loaded into the nonvolatile memory; and
wherein the microelectronic processor means is coupled to the firmware memory and to the programming mode means and is responsive to the firmware instructions to transfer user program instructions in the first program language from the volatile memory to the nonvolatile memory in response to selection of the first programming mode, and
wherein the microelectronic processor means is responsive to the firmware instructions to transfer user program instructions in the second program language from the volatile memory to the nonvolatile memory in response to the selection of the second programming mode.

12. The improved programmable controller of claim 11, further comprising:
power supply means external to the processor module, the power supply means being coupled to a nonvolatile memory socket on the processor module through the connector to provide a programming voltage sufficient to write user program instructions into the nonvolatile memory;
wherein the firmware memory stores firmware instruction to check for the connection of the power supply means to the processor module; and
wherein the microelectronic processor means is responsive to the firmware instructions to check for the connection of the power supply means to the processor module before the microelectronic processor means is responsive to the firmware instructions for transferring user program instructions to the nonvolatile memory.

13. The improved programmable controller of claim 12, wherein the power supply means is an external d-c power supply that is adapted to be connected between a 120 a-c volt outlet and a connector on the processor module.

14. The improved programmable controller of claim 11, wherein the microelectronic processor means is responsive to sense the selected programming mode and to load the user program instructions in the selected user program language into a half of the nonvolatile memory reserved for user program instructions in the selected program language.

15. The improved programmable controller of claim 11, wherein the microelectronic processor means is responsive to the selection of the second programming mode to execute firmware instructions to write user program instructions in machine language into the nonvolatile memory.

16. An improved programmable controller having a processor module with a read/write volatile memory that stores program instructions, with a connector adapted to couple the processor module to a programming terminal and with microelectronic processor means coupled to the volatile memory and coupled to the connector for receiving user program instructions from the programming terminal, wherein the improvement comprises:

a socket on the processor module that is adapted to electrically connect a nonvolatile memory to the microelectronic processor means;

a firmware memory on the processor module which stores a first group of firmware instructions to direct the transfer of user program instructions to the nonvolatile memory from the volatile memory and which stores a second group of firmware instructions to check for the connection of a source of programming voltage, the firmware memory means being coupled to the microelectronic processor means;

power supply means external to the processor module, the power supply means being coupled to a nonvolatile memory socket on the processor module through the connector to provide a source of programming voltage sufficient to write user program instructions into the nonvolatile memory; and wherein the microelectronic processor means is responsive to the second group of firmware instructions in the firmware memory to check for the connection of the power supply means to the processor module before executing the firmware instructions to couple user program instructions to the nonvolatile memory.

* * * * *

UNITED STATES PATENT AND TRADEMARK OFFICE
CERTIFICATE OF CORRECTION

PATENT NO. : 4,443,865
DATED : April 17, 1984
INVENTOR(S) : Ronald E. Schultz et al It is certified that error appears in the above—identified patent and that said Letters Patent is hereby corrected as shown below:

Column 2, line 63, "at least" should be --a least--

Column 4, line 55, "circuht" should be --circuit--

Column 23, line 59, "code" should be --codes--

Signed and Sealed this

Twenty-eighth Day of August 1984

[SEAL]

*Attest:*

GERALD J. MOSSINGHOFF

*Attesting Officer*     *Commissioner of Patents and Trademarks*